(12) United States Patent
Moorman et al.

(10) Patent No.: US 12,008,095 B2
(45) Date of Patent: Jun. 11, 2024

(54) SMART LOCK SYSTEM

(71) Applicant: STRATIS IOT, INC., Philadelphia, PA (US)

(72) Inventors: Felicite Moorman, Philadelphia, PA (US); Ryan Buchert, Philadelphia, PA (US)

(73) Assignee: STRATIS IOT, INC., Richardson, TX (US)

( * ) Notice: Subject to any disclaimer, the term of this patent is extended or adjusted under 35 U.S.C. 154(b) by 1092 days.

(21) Appl. No.: 16/191,023

(22) Filed: Nov. 14, 2018

(65) Prior Publication Data

US 2019/0147157 A1 May 16, 2019

Related U.S. Application Data

(60) Provisional application No. 62/586,028, filed on Nov. 14, 2017.

(51) Int. Cl.
| | |
|---|---|
| *G06F 21/35* | (2013.01) |
| *G06F 21/44* | (2013.01) |
| *H04L 9/08* | (2006.01) |
| *H04L 9/32* | (2006.01) |
| *H04L 9/40* | (2022.01) |
| *H04W 4/80* | (2018.01) |
| *H04W 12/0471* | (2021.01) |

(52) U.S. Cl.
CPC .............. *G06F 21/35* (2013.01); *G06F 21/44* (2013.01); *H04L 9/0861* (2013.01); *H04L 9/0872* (2013.01); *H04L 9/3271* (2013.01); *H04L 9/3297* (2013.01); *H04L 63/0492* (2013.01); *H04L 63/061* (2013.01); *H04W 4/80* (2018.02); *H04W 12/0471* (2021.01); *H04L 2209/805* (2013.01)

(58) Field of Classification Search
CPC ....... G06F 21/35; G06F 21/44; H04L 9/0861; H04L 9/3271; H04L 9/3297; H04L 63/0492; H04L 63/061; H04L 2209/805; H04L 9/0872; H04W 4/80; H04W 12/0471

See application file for complete search history.

(56) References Cited

U.S. PATENT DOCUMENTS

| | | | | |
|---|---|---|---|---|
| 8,799,655 | B1 * | 8/2014 | Dotan ................. | H04L 63/0838 713/168 |
| 2002/0178385 | A1 * | 11/2002 | Dent .................. | G07C 9/00309 726/27 |
| 2004/0268131 | A1 * | 12/2004 | Kudo .................. | H04L 63/0869 713/182 |
| 2010/0107229 | A1 * | 4/2010 | Najafi ................. | H04W 12/069 709/248 |
| 2014/0189831 | A1 * | 7/2014 | Kemshall ............. | H04L 9/3234 726/6 |
| 2016/0036788 | A1 * | 2/2016 | Conrad ................ | H04W 12/06 713/168 |

(Continued)

FOREIGN PATENT DOCUMENTS

CN          103597496 A  *  2/2014    ........... H04L 9/3271

*Primary Examiner* — Maung T Lwin
*Assistant Examiner* — Suman Debnath
(74) *Attorney, Agent, or Firm* — HAYNES AND BOONE, LLP

(57) ABSTRACT

Provided are methods and systems for controlling access to a property via one or more electronic locks.

28 Claims, 9 Drawing Sheets

(56) References Cited

U.S. PATENT DOCUMENTS

| | | | |
|---|---|---|---|
| 2016/0148194 A1* | 5/2016 | Guillaud | G06Q 20/341 |
| | | | 235/492 |
| 2016/0182500 A1* | 6/2016 | Ligatti | H04L 9/3271 |
| | | | 713/156 |
| 2017/0264608 A1* | 9/2017 | Moore | G07C 9/257 |
| 2017/0303090 A1* | 10/2017 | Stitt | H04W 4/021 |
| 2017/0337755 A1* | 11/2017 | Biehl | H04W 12/108 |
| 2018/0302400 A1* | 10/2018 | Covdy | H04L 63/0853 |
| 2021/0297257 A1* | 9/2021 | Lee | H04L 63/18 |

* cited by examiner

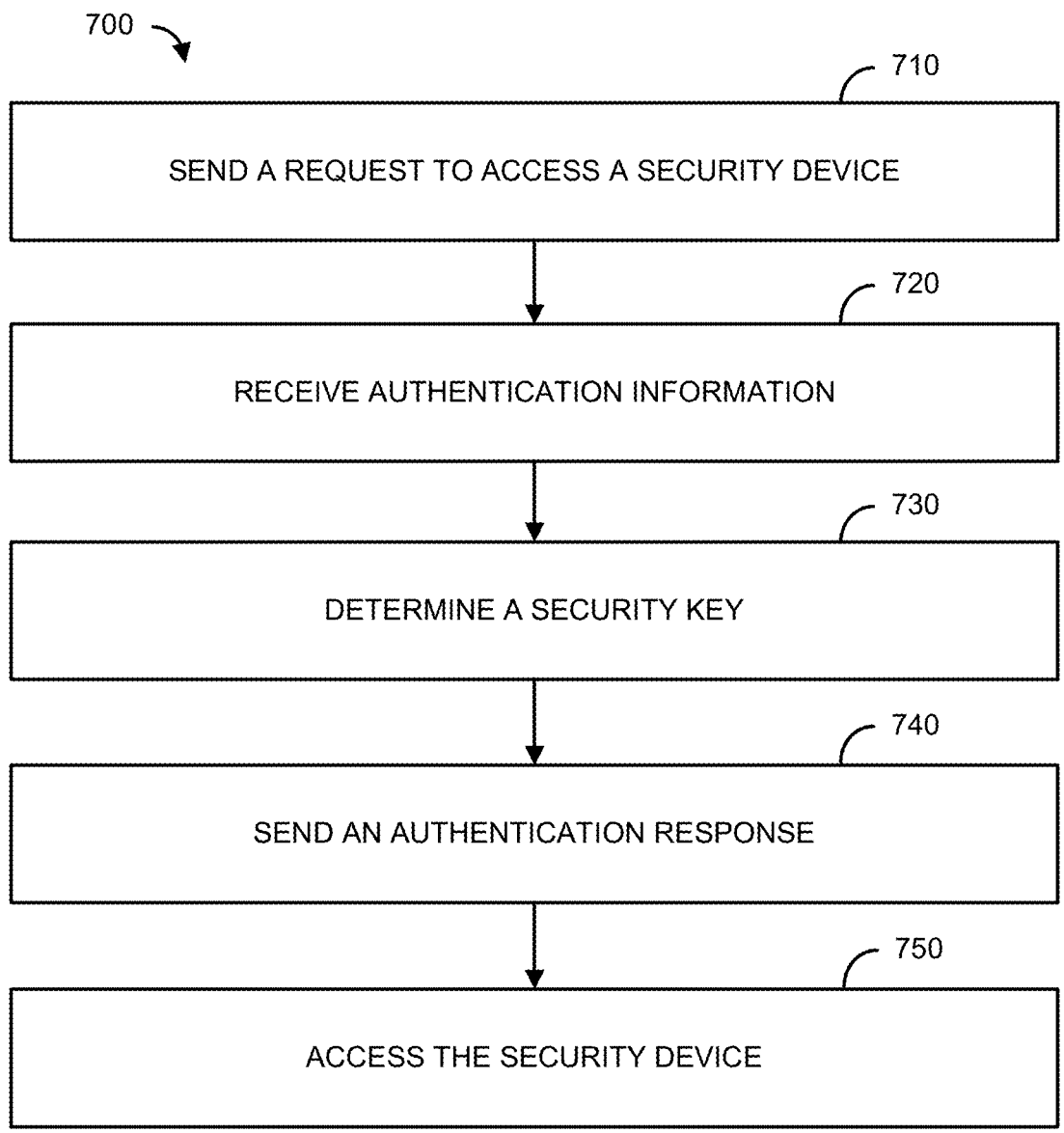

SMART LOCK SYSTEM

CROSS REFERENCE TO RELATED PATENT APPLICATION

This application claims priority to U.S. Provisional Application No. 62/586,028 filed Nov. 14, 2017, which are herein incorporated by reference in its entirety.

SUMMARY

It is to be understood that both the following general description and the following detailed description are exemplary and explanatory only and are not restrictive. Provided are methods and systems for a smart lock system. A smart lock system may be used to control access to a property (e.g., a location, a premise, etc.) via one or more electronic locks.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 7 is a flowchart of an example method for a smart lock system.

DETAILED DESCRIPTION

Figure 1:
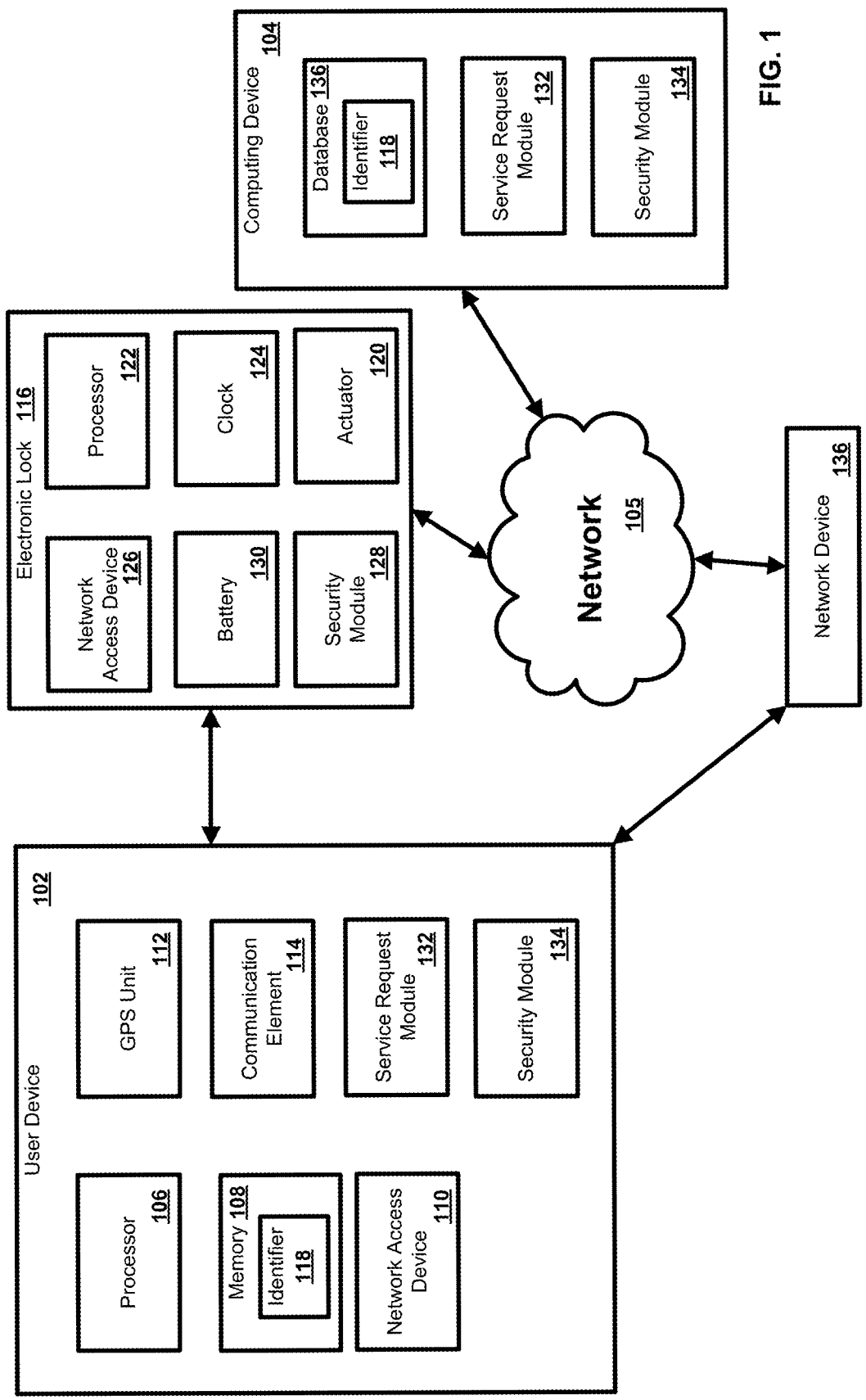
FIG. 1 is an example operating environment.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, solid state, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates various aspects of an exemplary environment in which the present methods and systems can operate. One skilled in the art will appreciate that provided herein is a functional description and that the respective functions can be performed by software, hardware, or a combination of software and hardware.

In an aspect, disclosed is a user device 102 in communication with a computing device 104 such as a server, for example. In an aspect, the user device 102 can be an electronic device such as a computer, a smartphone, a laptop, a tablet, a computing device, or other device capable of communicating with the computing device 104. The computing device 104 can be disposed locally or remotely relative to the user device 102. As an example, the user device 102 and the computing device 104 can be in communication via a private and/or public network 105 such as the Internet, a local area network, a wide area network, a cellular network, a satellite network, combinations thereof, and the like. Other forms of communications can be used such as other wired and wireless telecommunication channels, for example.

The user device 102 can comprise a processor 106. The processor 106 can be, or can comprise, any suitable microprocessor or microcontroller, for example, a low-power application-specific controller (ASIC) and/or a field programmable gate array (FPGA) designed or programmed specifically for the task of controlling a device as described herein, or a general purpose central processing unit (CPU), for example, one based on 80×86 architecture as designed by Intel™ or AMD™, or a system-on-a-chip as designed by ARM™. The processor 106 can be coupled (e.g., communicatively, operatively, etc. . . . ) to auxiliary devices or modules of the user device 102 using a bus or other coupling.

The user device 102 can comprise a non-transitory memory device 108 coupled to the processor 106. The memory device 108 can comprise a random access memory (RAM) configured for storing program instructions and data for execution or processing by the processor 106 during control of the user device 102. When the user device 102 is powered off or in an inactive state, program instructions and data can be stored in a long-term memory, for example, a non-volatile magnetic optical, or electronic memory storage device (not shown). Either or both of the RAM or the long-term memory can comprise a non-transitory computer-readable medium storing program instructions that, when executed by the processor 106, cause the user device 102 to perform all or part of one or more methods and/or operations described herein. Program instructions can be written in any suitable high-level language, for example, C, C++, C#, JavaScript, Python, or Java™ and compiled to produce machine-language code for execution by the processor 106.

In an aspect, the user device 102 can comprise a network access device 110 allowing the user device 102 to be coupled to one or more ancillary devices such as via an access point (a network device 136) of a wireless telephone network, local area network, or other coupling to a wide area network, for example, the Internet. The network access device 110 can comprise a wireless interface (not shown), for example a transceiver using any suitable wireless protocol, for example WiFi (IEEE 802.11), Bluetooth®, infrared, or other wireless standard. In that regard, the processor 106 can be configured to share data with the one or more ancillary devices via the network access device 110. The shared data can comprise, for example, user authentication data, last known or current device states, or security access keys, and/or any other data. Similarly, the processor 106 can be configured to receive control instructions from the one or more ancillary devices via the network access device 110. For example, a configuration of the user device 102, an operation of the user device 102, and/or other settings of the user device 102, can be controlled by the one or more ancillary devices via the network access device 110. For example, an ancillary device can comprise the computing device 104 that can provide various services.

In an aspect, the user device 102 can comprise a global positioning system (GPS) unit 112. The GPS unit 112 can detect a current location of the user device 102. In some aspects, a user can request access to one or more services that rely on a current location of the user. For example, a processor in the user device 102 can receive location data from the GPS unit 112, convert it to usable data, and transmit the usable data to the one or more services via the network access device 110. GPS unit 112 can receive position information from a constellation of satellites operated by the U.S. Department of Defense. Alternately, the GPS unit 112 can be a GLONASS receiver operated by the Russian Federation Ministry of Defense, or any other positioning device capable of providing accurate location information (for example, LORAN, inertial navigation, and the like). The GPS unit 112 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range.

The user device 102 can comprise a communication element 114 for providing an interface to a user to interact with the user device 102 and/or the computing device 104. The communication element 114 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 102 and the computing device 104. The communication element 114 can request or query various files from a local source and/or a remote source. For example, the communication element 114 can transmit to and receive data from a local or remote device such as the computing device 104. As a further example, the communication element 114 can utilize the network access device 110 to transmit to and receive data from an electronic lock 116 (e.g., a smart lock, a computing device, intelligent locking mechanism, etc.) and/or the computing device 104.

The electronic lock 116 can comprise an actuator 120, a processor 122, an internal time clock 124, a network access device 126, a security module 128, and a battery 130. The network access device 126 allows the electronic lock 116 to communicate with the user device 102 and/or the computing device 104 via the network 105. The network access device 126 can comprise a wireless interface (not shown), for example a transceiver using any suitable wireless protocol, for example WiFi (IEEE 802.11), Bluetooth®, infrared, or other wireless standard. The internal time clock 124 can provide a time reference to the processor 122. The processor 122 can be, or can comprise, any suitable microprocessor or microcontroller, for example, a low-power application-specific controller (ASIC) and/or a field programmable gate array (FPGA) designed or programmed specifically for the task of controlling a device as described herein, or a general purpose central processing unit (CPU), for example, one based on 80×86 architecture as designed by Intel™ or AMD™, or a system-on-a-chip as designed by ARM™. The processor 122 can be coupled (e.g., communicatively, operatively, etc. . . . ) to auxiliary devices or modules of the electronic lock 116 using a bus or other coupling. The electronic lock 116 can comprise a security module 128 that can provide secure storage for secret information and can perform cryptographic calculations. Power for the electronic lock 116 can be supplied by a battery 130 or other power supply.

In an aspect, the user device 102 can be associated with an identifier 118. As an example, the identifier 118 can be any identifier, token, character, string, or the like, for differentiating one user or user device (e.g., user device 102) from another user or user device. In a further aspect, the identifier 118 can identify a user or user device as belonging to a particular class of users or user devices. As a further example, the identifier 118 can comprise information relating to the user device such as a manufacturer, a model or type of device, a service provider associated with the user device 102, a state of the user device 102, a locator, and/or a label or classifier. Other information can be represented by the identifier 118.

In an aspect, a service request module 132 can comprise one or more software applications configured to permit a user of the user device 102 to participate in one or more services provided by the computing device 104. For example, the one or more services can comprise a maintenance request service, a lock/unlock service, a leasing service, combinations thereof, and the like. The maintenance request service can refer to a service that enables a tenant to enter and transmit a request for service to the computing device 104. For example, if a tenant has a leaking roof, the service request module 132 can enable the user to describe the issue (e.g., via text and/or photographs) and transmit a service request to a landlord/service company to have the issue resolved. The request can comprise one or more available dates and/or times that the tenant authorizes repairs to be performed. The service request module 132 can enable the user to track the progress of the request and can notify the user of one or more events related to the request (e.g., request received, request approved, further information required, requested date/time, etc. . . . ). The service request module 132 can also be made available via the Internet (e.g., a website) to enable a user to request service via any Internet-enabled device. A lock/unlock service can refer to a service whereby a user can enable access and/or deny access to a property that is secured via the electronic lock 116 to one or more third parties. For example, if a user is desirous of granting access to property in the user's absence, the user can utilize the service request module 132 to authorize access to the one or more third parties for a given date/time and/or range of dates/times. The leasing service can refer to a service that enables an agent (e.g., leasing agent, real estate agent, etc. . . . ) to gain access to secured property. For example, if a user offering property up for sale or lease can grant access to the property via the service request module 132 to authorize access the agent for a given date/time and/or range of dates/times.

In an aspect, a security module 134 can comprise one or more software applications configured to store, generate, authenticate, transmit, and/or receive, one or more security keys. A security key can comprise one or more codes that can be authenticated/authorized to cause the electronic lock 116 to lock and/or unlock. The security module 134 can also comprise an identifier of the electronic lock 116. As an example, the identifier can be any identifier, token, character, string, or the like, for differentiating one electronic lock (e.g., electronic lock 116) from another electronic lock. In a further aspect, the identifier can identify an electronic lock as belonging to a particular class of electronic locks. As a further example, the identifier can comprise information relating to the electronic lock such as a manufacturer, a model or type of device, a service provider associated with the electronic lock 116, a state of the electronic lock 116, a locator, and/or a label or classifier. Other information can be represented by the identifier.

In an aspect, the computing device 104 can be a server for communicating with the user device 102. As an example, the computing device 104 can communicate with the user device 102 for providing data and/or services. The data and/or services can comprise a maintenance request service, a lock/unlock service, a leasing service, combinations thereof, and the like. In an aspect, the computing device 104 can manage the communication between the user device 102 and a database 136 for sending and receiving data therebetween. As an example, the database 136 can store user data, security keys, identifier 118, and/or other information. As a further example, the user device 102 can request and/or retrieve a file from the database 136. In an aspect, the database 136 can store one or more security keys relating to the electronic lock 116. As an example, the computing device 104 can obtain the identifier 118 from the user device 102 and retrieve one or more security keys from the database 136 based on the identifier 118. The computing device 104 can also receive data from the electronic lock 116 in the database 136. As an example, the computing device 104 can obtain the identifier from the electronic lock 116 and retrieve one or more security keys from the database 136 based on the identifier. In a further example, the computing device 104 can obtain the identifier 118 from the user device 102 and the identifier from the electronic lock 116 and retrieve one or more security keys from the database 136 based on the identifiers. Any information can be stored in and retrieved from the database 136. The database 136 can be disposed remotely from the computing device 104 and accessed via direct or indirect connection. The database 136 can be integrated with the computing device 104 or some other device or system.

The computing device 104 can comprise the service request module 132. The service request module 132 can comprise one or more software applications configured to permit a user of the computing device 104 to participate in one or more services provided by the computing device 104 to the user device 102. The service request module 132 can enable services such as a maintenance request service, a lock/unlock service, a leasing service, combinations thereof, and the like. For example, when a user utilizes the user device 102 or another computing device, to submit a service request, the service request module 132 can receive the request and provide functionality to the landlord/service provider/etc. . . . to process the request (e.g., approve, deny, request more information, etc. . . . ).

The computing device 104 can comprise the security module 134. The security module 134 can comprise one or more software applications configured to store, generate, authenticate, transmit, and/or receive, one or more security keys. A security key can comprise one or more codes that can be authenticated/authorized to cause the electronic lock 116 to lock and/or unlock.

In an aspect, the service request module 132 can reside on one computing device and the security module 134 can reside on another computing device. The two computing devices can communicate to exchange data between the service request module 132, the security module 134, the user device 102, and/or the electronic lock 116.

In operation, the electronic lock 116 can be supplied with one or more security keys by the computing device 104. The one or more security keys can be supplied to the electronic lock 116, for example, when the electronic lock 116 is installed, at regular intervals, or on demand. The one or more security keys can be customized to a particular door or doors and to particular dates or times. In an aspect, a single security key can be issued for the electronic lock 116 for each authorized time period (e.g., day, week). However, the same security key may be issued for multiple electronic locks 116. The computing device 104 may also provide the electronic lock 116 with a time indication to indicate the period during which the security key is valid. The computing device 104 may use an enciphered communication channel based on a secret, symmetric key to communicate with the electronic lock 116 to secure communications against interception. The cipher key may be a symmetric key known only to the electronic lock 116 and/or the computing device 104 or, alternatively, a public/private key pair may be used for encryption and decryption. In an aspect, a temporary key can be generated by the user device 102, encrypted by the security module 134 and sent to the electronic lock 116 by the user device 102. The electronic lock 116 can then use the temporary key for further communications with the user device 102 until the temporary key expires.

In another aspect, no communication is necessary between the electronic lock 116 and the computing device 104 after installation of the electronic lock 116. The electronic lock 116 can be programmed with a master security key, a device identifier, and an initial value for the clock 124. Each electronic lock 116 may generate a new security key at a specified time, as determined by the clock 124 by combining the master security key with its device identifier and the date using a predetermined combining algorithm. The computing device 104 can also generate a security key for any electronic lock 116 and date by combining the same input variables using the same combining algorithm, which it may then supply to the user device 102.

In use, the user device 102 can establish communications with the computing device 104. An authentication procedure can be performed to confirm that the user device 102 is an authorized recipient of a security key. Upon authentication, the computing device 104 can send one or more security keys and any associated time indications to the user device 102 (e.g., cryptographically). Time indications may be needed when multiple security keys for different time periods are transferred so that the user device 102 will know which security keys to use for any given time period. The computing device 104 can further transmit one or more identifiers of the electronic lock 116 to the user device 102.

The security keys can be stored in the memory 108 and/or the security module 134 of the user device 102. The user device 102 can be used to unlock the electronic lock 116. The user device 102 can enter communication range of the electronic lock 116 and can establish a communication session (e.g., via Bluetooth) with the electronic lock 116. The user device 102 can transmit a request to the electronic lock 116 to unlock via the communication session. The request may include the identifier of the electronic lock 116 and/or the identifier 118 of the user device 102. Upon receipt of the request, the electronic lock 116 can generate an authentication challenge in security module 128. The authentication challenge transmitted by the electronic lock 116 can comprise a locally-generated random bitstring or number obtained from the security module 128. The authentication challenge may further include the current time indication, which can be supplied by either the computing device 104 or by the clock 124.

Upon receipt of the authentication challenge, the user device 102 can combine at least the random bitstring of the authentication challenge with the appropriate security key for the current time period to form an authentication response. The time indication in the authentication challenge (if present) may be used by the user device 102 to select the appropriate security key. The user device 102 can then transmit the authentication response to the electronic lock 116.

The electronic lock 116 can compare the received authentication response with an expected authentication response calculated by the electronic lock 116 or supplied by the computing device 104. If the received authentication response matches the expected authentication response, the electronic lock 116 actuates the actuator 120 to unlock the electronic lock 116.

The security key supplied by the computing device 104 to the user device 102 may comprise a combination of secret security keys with at least a time indication indicating the time period during which the security key is valid. The user of the user device 102 is, therefore, unable to produce security keys for a time period of the user's choosing, since the user does not possess the secret security key.

Generating and/or usage of security keys can rely on a non-reversible function. The purpose of a non-reversible function is to render impossible or impractical the determination of the master security key or security key given the output of the function and all other non-secret input variables. Likewise, the non-reversible function renders impractical the generation of security keys for another electronic lock or time period given the security keys for one electronic lock or time period, or given the security key for many other electronic locks and/or time periods. Such a non-reversible function can be provided by using a block cipher, using the secret data at the key input, and other data bits as the data to be encrypted input. A block cipher, for example, AES or DES, may be used, for example.

Figure 2:
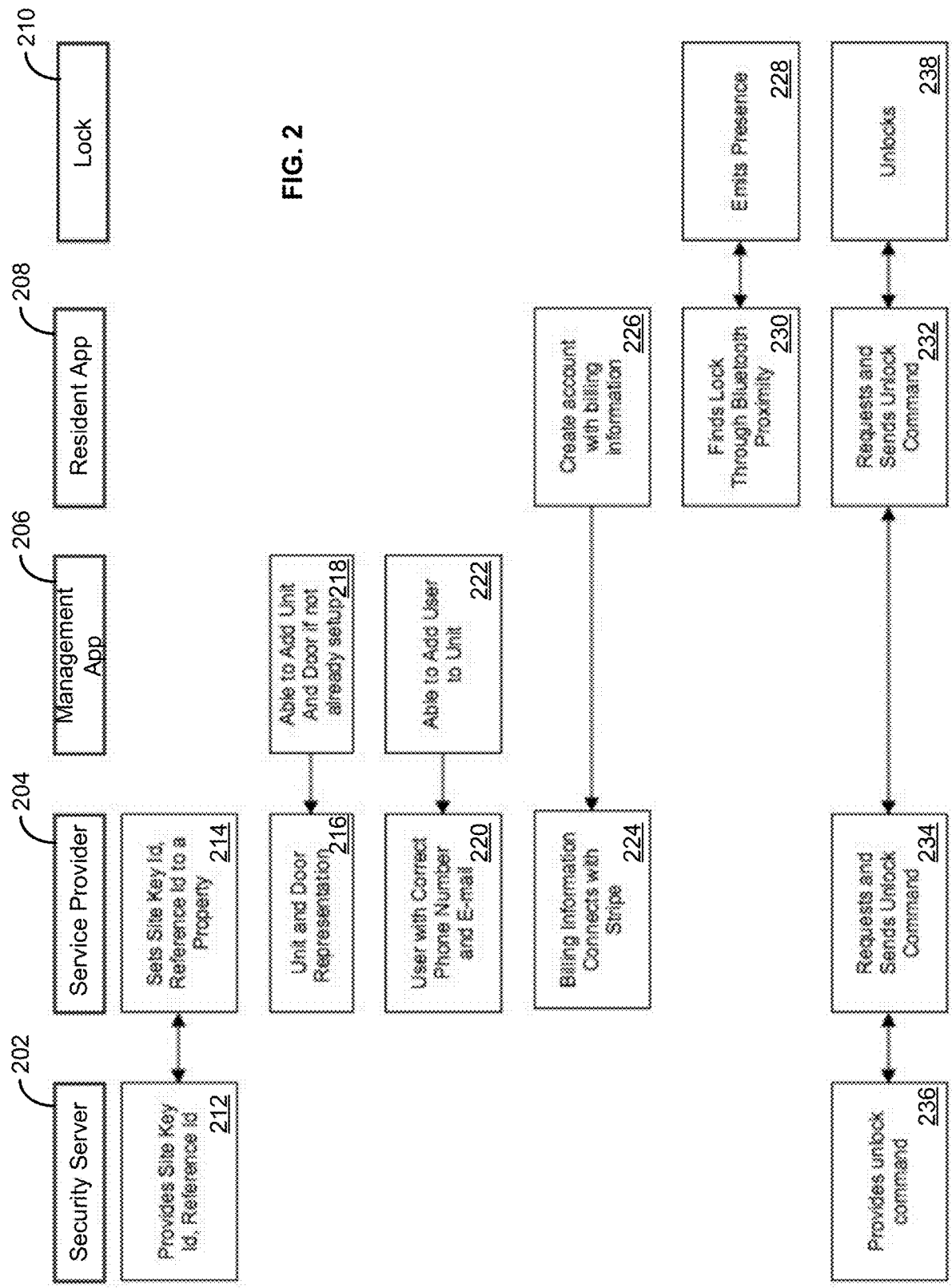
FIG. 2 is an operational flow for the disclosed methods.

FIG. 2 illustrates an example operational flow for one or more disclosed methods. In an aspect, the flow diagram illustrates an example interplay between a security server 202 (e.g., computing device 104 or other computing device), a service provider 204 (e.g., computing device 104 or other computing device), a management app 206 (e.g., service request module 132/security module 134), a resident app 208 (e.g., service request module 132/security module 134), and a lock 210 (e.g., the electronic lock 116). At 212 the security server 202 can provide data to the service provider 204 that can identify a property, including individual units present on the property (e.g., in the case of an apartment complex). The data can comprise for example, a site key identifier and/or a reference identifier. The site key identifier can be a long random set of characters that can be used as part of the encryption process. The reference identifier can be used by separate systems to refer to the property using a single numeric identifier. At 214 the service provider can set the site key identifier and/or the reference identifier to a specific property. At 216 the service provider 204 can establish a relationship between the site key identifier and/or a reference identifier and one or more specific locks 210. In an aspect, establishing the relationship can comprise creating a unit and/or door representation in a database that correlates a specific unit and/or door with the site key identifier and/or the reference identifier. If, at 216, there is not yet a unit and/or door representation the management app 206 can be used to add the unit and/or door to the database for use in creating the representation at 218. At 220 the service provider 204 can associate user data with the unit and/or door representation. For example, the user data can comprise user name, phone number, email address, and the like. If, at 220, the user data is not present, the management app 206 can be used to add the user data and associate the user data with the unit and/or door representation at 222.

At 224, billing information associated with the user data can be obtained. For example, the billing information can be obtained from a third party billing service/server. If, at 224, the billing information is not available, the user can utilize the resident app 208 (for example, on user device 102) to enter the billing information to the third party billing service/server and/or to the service provider 204 directly at 226.

At this point in the operational flow, one or more scenarios can result in a need for access to the lock 210 to be granted. For example, a service request. The lock 210 can be configured to emit a presence at 228. For example, one or more wireless beacons. A user device 102 with the resident app 208 operating thereon can identify the presence of the lock 210 at 230. At 232 the resident app 208 can transmit a request for a security key to the service provider 204. At 234 the service provider 204 can relay the request for the security key to the security server 202. At 236 the security server 202 can generate the security key, retrieve a pre-generated security key, and/or the like and send the security key as an unlock command to the service provider 204. At 234 the service provider 204 can relay the unlock command to the resident app 208. At 232 the resident app 208 can transmit the unlock command to the lock 210. At 238 the lock can unlock.

Figure 3:
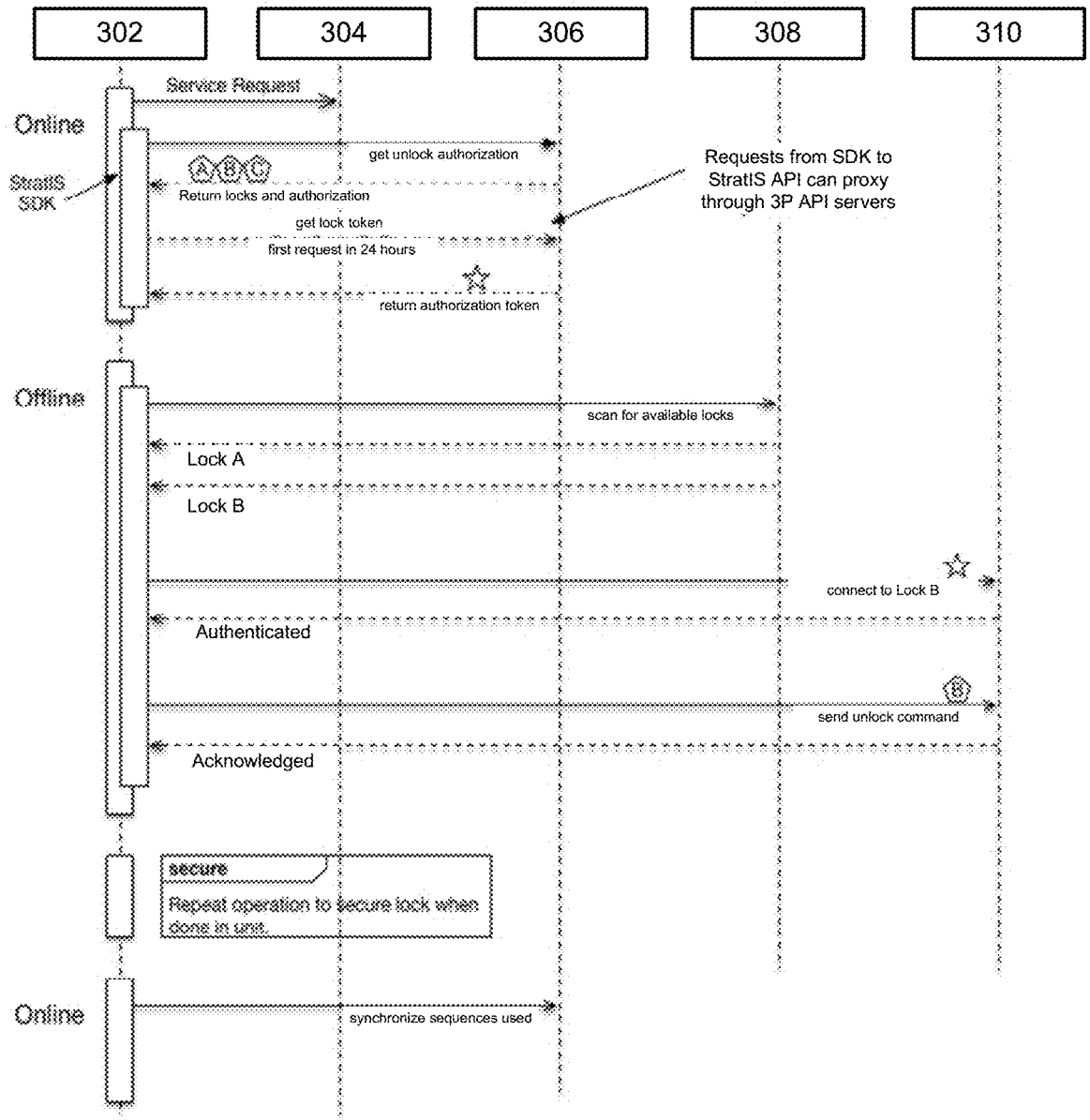
FIG. 3 is an operational flow for the disclosed methods.

FIG. 3 illustrates another example operational flow for one or more disclosed methods. In an aspect, property management software 302 (e.g., service request module 134) can be used by a service technician to select a service request from a resident for processing. The property management software 302 can send the selected service request to a property management server 304. The property management server 304 (e.g., computing device 104) can execute backend property management software (e.g., service request module 134) that can manage one or more aspects related to the service request (e.g., scheduling, approval, denial, requests for more information, and the like). The property management software 302 can also transmit the selected service request to a security server 306. In an aspect, the property management software 302 can transmit the selected service request directly to the security server 306 or through the property management server 304 as a proxy. The security server 306 can determine one or more electronic locks (e.g., electronic lock 116) and one or more security keys associated with the one or more electronic locks. The security server 306 can also determine one or more restrictions related to the service request (e.g., authorized date, time, duration, etc. . . . ). The security server 306 can generate an authorization token and transmit the authorization token, along with an identifier of the associated electronic lock to the property management software 302 (e.g., either directly or through the property management server 304). In an aspect, the authorization token can be configured to expire after a time period, for example, 24 hours. After 24 hours has expired, a new authorization token would need to be requested. The preceding operational flow requires some form of network connection for the property management software 302, the property management server 304, and the security server 306 to exchange data (e.g., requests, security keys, tokens, identifiers, etc. . . . ).

The following operation flow does not require some form of network connection between the property management software 302, the property management server 304, and the security server 306. The user device executing the property management software 302 can be positioned within range of a residential unit associated with the service request. The property management software 302 can utilize a short range wireless function 308 (e.g., Bluetooth) to scan for one or more electronic locks, such as an electronic lock 310 (e.g., electronic lock 116). The property management software 302, upon identifying the electronic lock 310 can connect to the electronic lock 310 and perform an authentication process. Once authenticated, the property management software 302 can transmit the authorization token/unlock command to the electronic lock 310. The electronic lock 310 can unlock and transmit an acknowledgement to the property management software 302. The authorization token can be used along with a sequence number in order to generate an unlock command. After an authorization token is used the system can make sure the next unlock command will be recognized by updating what sequence number the system is at so the next mobile device used to unlock the electronic lock does not have to sequence through already used sequence numbers.

Figure 4:
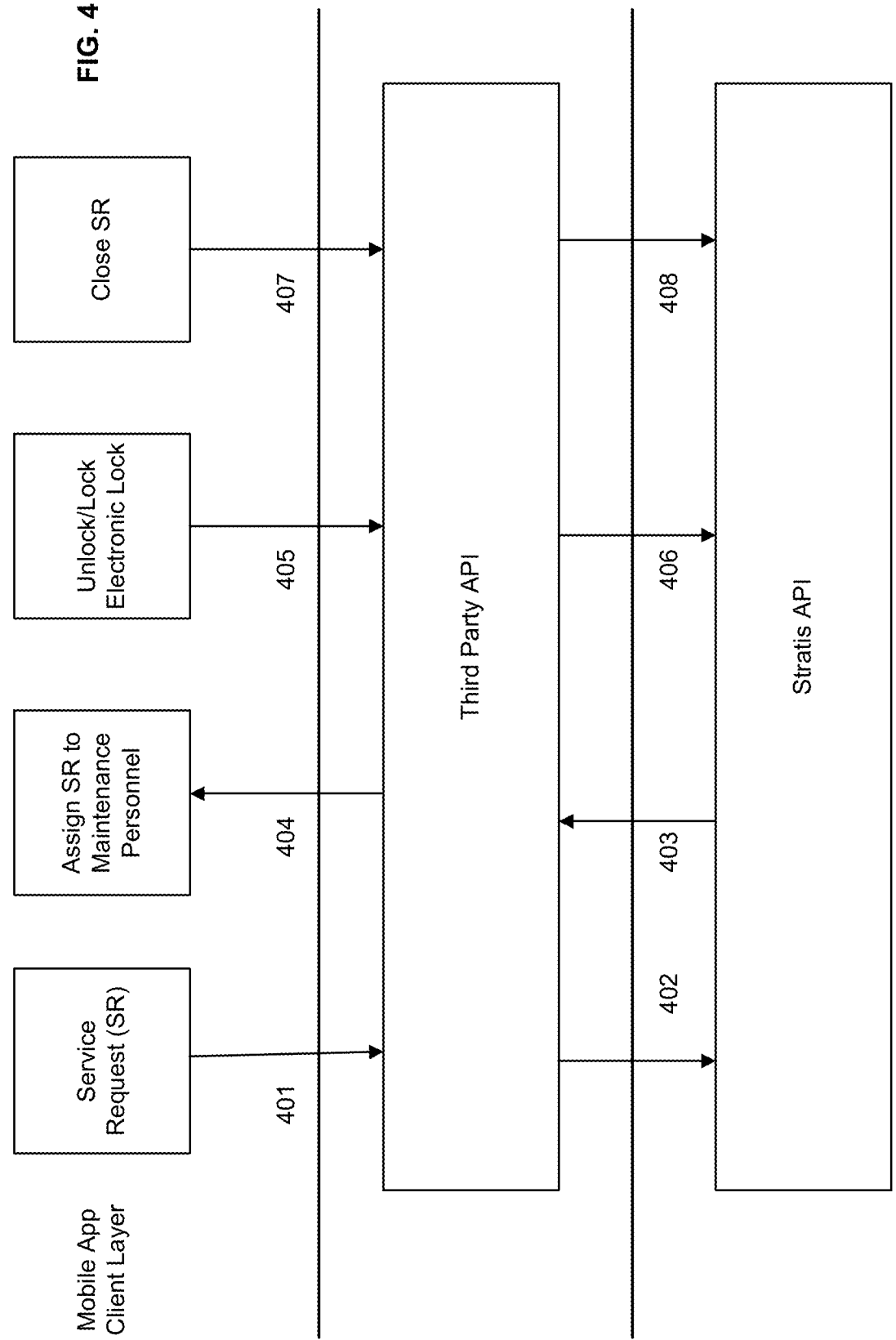
FIG. 4 is an example architecture.

FIG. 4 illustrates an example architecture for executing one or more disclosed methods. At 401, a service request is initiated normally either from another mobile application or third party integration for a particular unit. At 402, a key request for unit/lock assigned to unit goes to StratIS API server. At 403, an electronic key for unit is sent to third party API. At 404, an electronic key, along with service request is assigned and sent to maintenance person. In an aspect, a maintenance person would still need to turn on application, and sync, after service request has been assigned to personnel. At 405, maintenance personnel uses key to unlock and lock unit. At 406, any activities of unlocking and locking are sent to StratisIS API. In an aspect, the activities can be queued in offline mode. At 407, the maintenance personnel closes the service request. The key is revoked on mobile app layer and an action sent to third party API. At 408, key revocation is sent to StratIS API.

Figure 5:
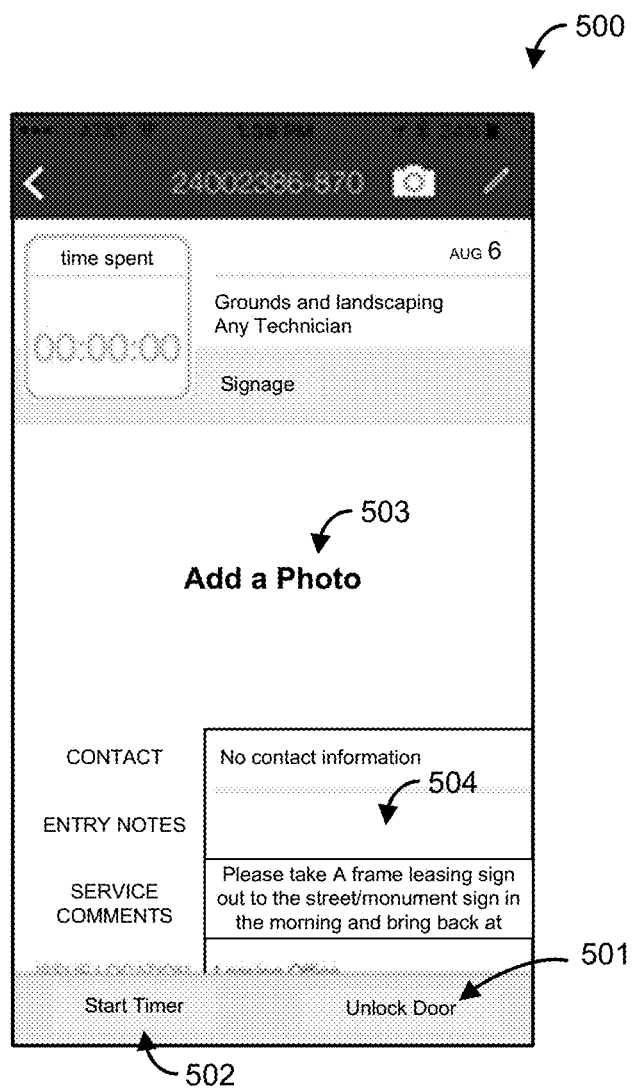
FIG. 5 is an example user interface.

FIG. 5 illustrates an example user interface 500 of a maintenance app. The user interface 500 can be used to enable property maintenance to unlock a door via user interface element 501, record the time spent working on a unit via user interface element 502, and take any necessary pictures or notes for the work done, via user interface element 503 and via user interface element 504, respectively.

Figure 6A:
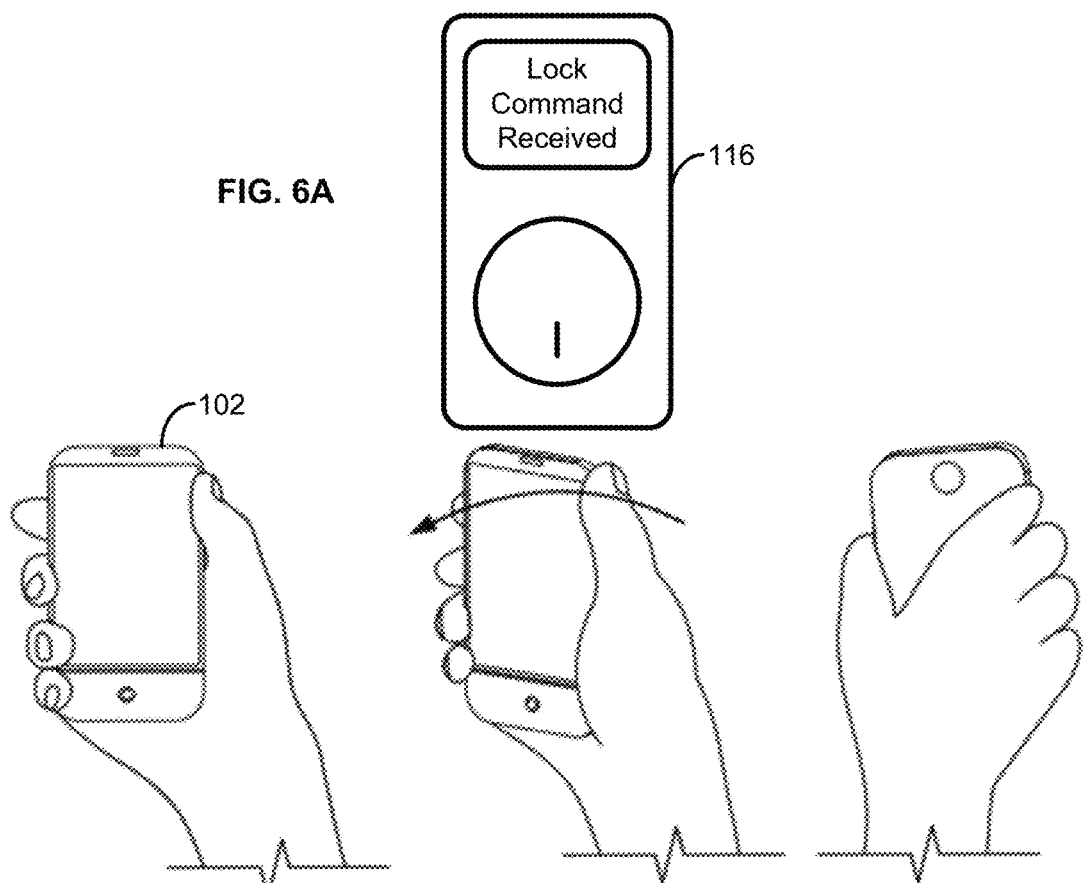
FIG. 6A is an example use of a smart lock system.
Figure 6B:
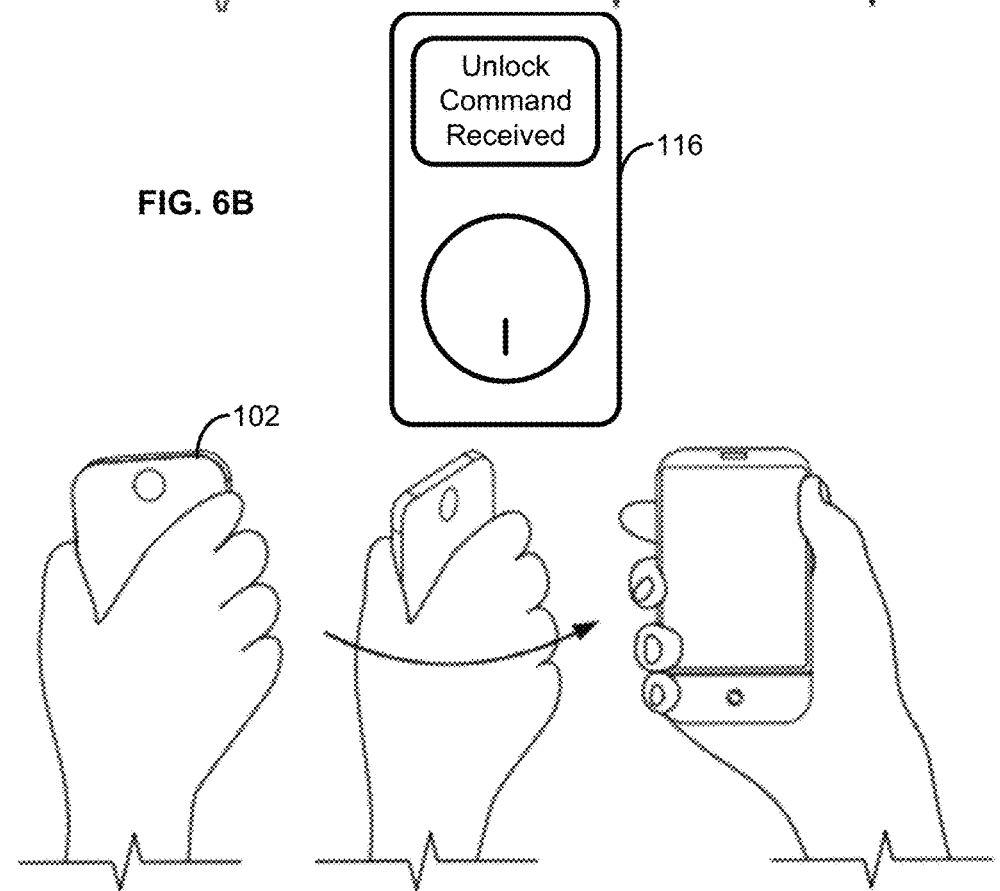
FIG. 6B is an example use of a smart lock system.

FIG. 6A and FIG. 6B illustrate an aspect wherein movement of the user device 102 is translated into a lock/unlock command for the lock 116. For example, the user device 102 can contain a sensor to detect its own movement by sensing acceleration, deceleration, and rotation, which may be measured by accelerometers and/or gyroscopes. As described previously, the user device 102 can enter communication range of the electronic lock 116 and can establish a communication session (e.g., via Bluetooth) with the electronic lock 116. In the aspect illustrated in FIG. 6A and FIG. 6B, movement of the user device 102 can cause transmission of the request to the electronic lock 116 to lock or to unlock via the communication session. FIG. 6A illustrates a rotation of the user device 102, e.g., rotating the user device 102 from the face of the user device 102 facing up to the face of the user device 102 facing down, that causes transmission of the lock command to the lock 116. FIG. 6B illustrates a rotation of the user device 102, e.g., rotating the user device 102 from the face of the user device 102 facing down to the face of the user device 102 facing up, that causes transmission of the lock command to the lock 116. Any movement and/or combinations of movements can be used to cause a lock or an unlock command to be transmitted.

FIG. 7 shows a flowchart of a method 700 for a smart lock system. At 710, a request may be sent to a security device to access the security device (e.g., a smart access device, a locking mechanism, the electronic lock 116, etc.). A user device (e.g., a computer, a smartphone, a laptop, a tablet, a computing device, etc.) may send a request for access to the security device. The user device may establish a communication session with the security device. The request for access may be sent via a short-range communication technique (e.g., BLUETOOTH®, near-field communication, infrared, and the like). The request for access may be sent via any communication technique. The request for access may include a request for the security device to transition from a locked to an unlocked state (or an unlocked state to a locked state), such as by actuating an actuator and/or locking mechanism. The request for access may include a request for the security device to permit (via a locking/unlocking mechanism/actuator) access to a location and/or premise that is secured by the security device. The request for access may be based on a maintenance request/service, a lock/unlock service, a leasing service, combinations thereof, and/or the like.

At 720, authentication information may be received. The user device may receive the authentication information based on the request for access. Upon receipt of the request for access, the security device can generate the authentication information (e.g., an authentication challenge, etc.) and send the authentication information to the user device. The authentication information may include one or more of a random bitstring or random value (number) generated by the security device. The authentication information may also include timing information. The timing information may include a current time indication, such as a current time when the request for access is received.

At 730, a security key may be determined. A security key can comprise one or more codes that can be authenticated/authorized to access the security device, such as by causing the security device to transition for a locked state to unlocked state. The user device may store and/or access a plurality of security keys associated with the security device. The user device may be authorized to receive the plurality of security keys and may receive the plurality of security keys from another device (e.g., the computing device 104, etc.) such as a device associated a with maintenance request service, a lock/unlock service, a leasing service, combinations thereof, and/or the like. The user device may generate each security of the plurality of security keys, such as part of a security installation procedure/process for installing one or more security devices at a location and/or premise. Each security key of the plurality of security keys may be associated with a respective time window. A time window may be and/or indicate a time when a respective security key may be used to access the security device. The user device may determine the security key based on the timing information received with the authentication information. For example, the user device may match the security key to the current time received with the authentication information (timing information) to determine that the security key may be used and/or is authorized to access the security device.

At 740, an authentication response may be sent. The user device may send an authentication response to the security device. The user device may send an authentication response to the security device based on at least a portion of the authentication information and the security key. For example, the user device can combine at least the random bitstring and/or random value of the authentication information with the security key (the security key associated with the current time window) to generate an authentication response. The user device can send the authentication response to the security device.

At 750, the security device may be accessed. The user device (or a user of the user device) may access the security device and/or a location/premise associated with the security device. The user device may send the authentication response to the security device. The security device may generate an expected response by using a non-reversible function to combine at least the random bitstring and/or random value of the authentication information with the security key (the security key associated with the current time window). The non-reversible function may render impossible or impractical the determination of security key based on an output of the function and a plurality of non-secret input variables. The non-reversible function may render impractical the generation of security keys for another security device or time window (e.g., current time). When the authentication response matches the expected authentication response, the security device may grant and/or allow access to the security device and/or a location/premise associated with the security device.

Figure 8:
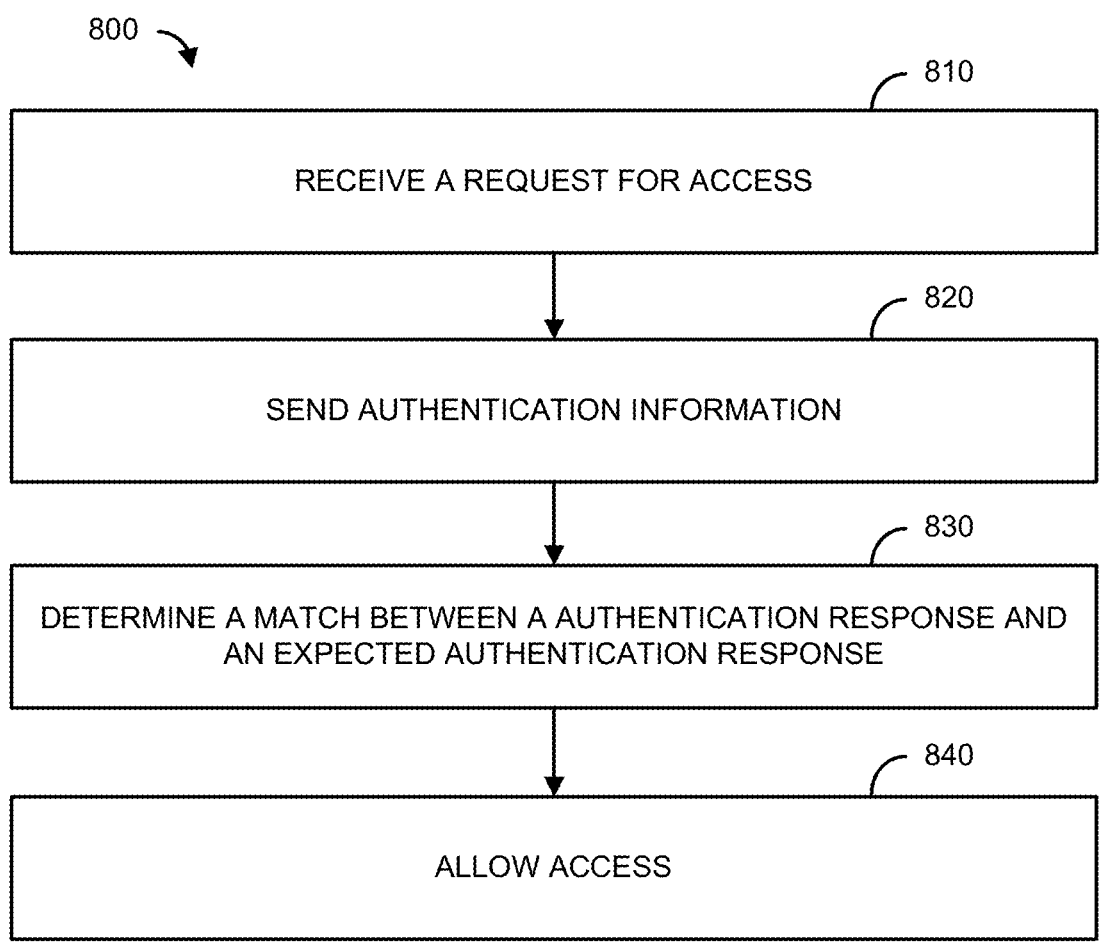
FIG. 8 is a flowchart of an example method for a smart lock system.

FIG. 8 shows a flowchart of a method 800 for a smart lock system. At 810, a request for access may be received. A security device (e.g., a smart access device, a locking mechanism, the electronic lock 116, etc.) may receive a request for access. A user device (e.g., a computer, a smartphone, a laptop, a tablet, a computing device, etc.) may send the request for access to the security device. The user device and/or security device may establish a communication session. The request for access may be received via a short-range communication technique (e.g., BLUETOOTH®, near-field communication, infrared, and the like) during the communication session. The request for access may be received via any communication technique. The request for access may include a request for the security device to transition from a locked to an unlocked state (or an unlocked state to a locked state), such as by actuating an actuator and/or locking mechanism. The request for access may include a request for the security device to permit (via a locking/unlocking mechanism/actuator) access to a location and/or premise that is secured by the security device. The request for access may be based on a maintenance request/service, a lock/unlock service, a leasing service, combinations thereof, and/or the like.

At 820, authentication information may be sent. The security device may send the authentication information to the user device based on the request for access. Upon receipt of the request for access, the security device can generate the authentication information (e.g., an authentication challenge, etc.) and send the authentication information to the user device. The authentication information may include one or more of a random bitstring or random value (number) generated by the security device. The authentication information may also include timing information. The timing information may include a current time indication, such as a current time when the request for access is received.

The user device may use the authentication information to determine a security key associated with the security device. A security key can comprise one or more codes that can be authenticated/authorized to access the security device, such as by causing the security device to transition for a locked state to unlocked state. The user device may store and/or access a plurality of security keys associated with the security device. The user device may be authorized to receive the plurality of security keys and may receive the plurality of security keys from another device (e.g., the computing device 104, etc.) such as a device associated a with maintenance request service, a lock/unlock service, a leasing service, combinations thereof, and/or the like. The user device may generate each security of the plurality of security keys, such as part of a security installation procedure/process for installing one or more security devices at a location and/or premise. Each security key of the plurality of security keys may be associated with a respective time window. A time window may be and/or indicate a time when a respective security key may be used to access the security device. The user device may determine the security key based on the timing information received with the authentication information. For example, the user device may match the security key to the current time received with the authentication information (timing information) to determine that the security key may be used and/or is authorized to access the security device.

At 830, an authentication response may be determined to match an expected authentication response. The user device may send an authentication response to the security device. The user device may send an authentication response to the security device based on at least a portion of the authentication information and the security key. For example, the user device can combine at least the random bitstring and/or random value of the authentication information with the security key (the security key associated with the current time window) to generate an authentication response. The security device can receive the authentication response from the user device. The security device may generate an expected response by using a non-reversible function to combine at least the random bitstring and/or random value of the authentication information with the security key (the security key associated with the current time window). The non-reversible function may render impossible or impractical the determination of security key based on an output of the function and a plurality of non-secret input variables. The non-reversible function may render impractical the generation of security keys for another security device or time window (e.g., current time).

At 840, the security device may be accessed. The security device may determine that the authentication response received from the user device matches the expected authentication response generated by the security device. The security device may allow access to the security device and/or a location/premise associated with the security device based on the authentication response matching the expected authentication response. The user device (or a user of the user device) may access the security device and/or a location/premise associated with the security device.

Figure 9:
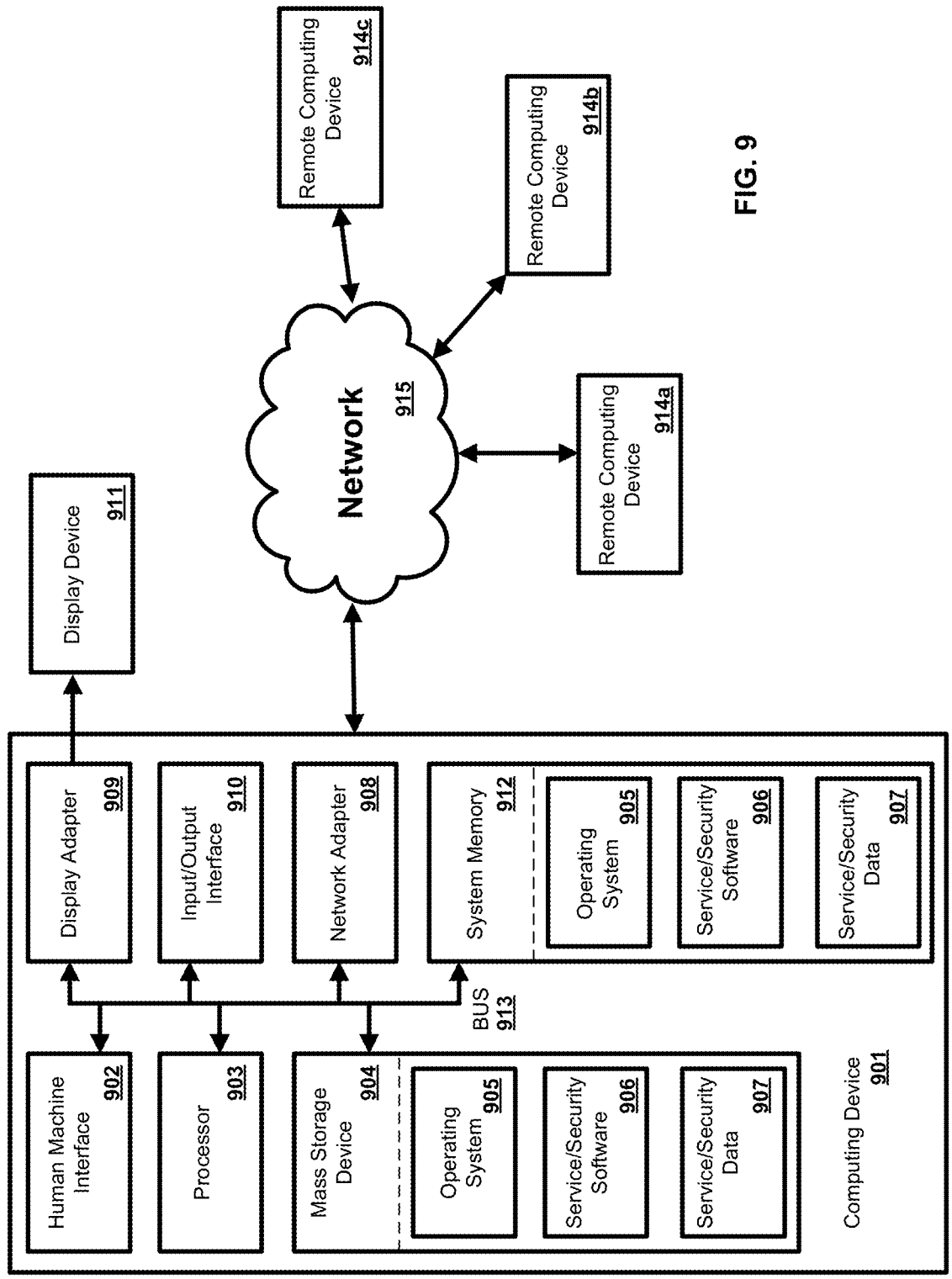
FIG. 9 is an example operating environment.

In an exemplary aspect, the methods and systems can be implemented on a computer 901 as illustrated in FIG. 9 and described below. By way of example, the user device 102, the electronic lock 116, the network device 136, and the computing device 104 of FIG. 1 can be a computer 901 as illustrated in FIG. 9. Similarly, the methods and systems disclosed can utilize one or more computers to perform one or more functions in one or more locations. FIG. 9 is a block diagram illustrating an exemplary operating environment 900 for performing the disclosed methods. This exemplary operating environment 900 is only an example of an operating environment and is not intended to suggest any limitation as to the scope of use or functionality of operating environment architecture. Neither should the operating environment 900 be interpreted as having any dependency or requirement relating to any one or combination of components illustrated in the exemplary operating environment 900.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 901. The computer 901 can comprise one or more components, such as one or more processors 903, a system memory 912, and a bus 913 that couples various components of the computer 901 including the one or more processors 903 to the system memory 912. In the case of multiple processors 903, the system can utilize parallel computing.

The bus 913 can comprise one or more of several possible types of bus structures, such as a memory bus, memory controller, a peripheral bus, an accelerated graphics port, and a processor or local bus using any of a variety of bus architectures. The bus 913, and all buses specified in this description can also be implemented over a wired or wireless network connection and one or more of the components of the computer 901, such as the one or more processors 903, a mass storage device 904, an operating system 905, service/security software 906, service/security data 907, a network adapter 908, system memory 912, an Input/Output Interface 910, a display adapter 909, a display device 911, and a human machine interface 902, can be contained within one or more remote computing devices 914a,b,c at physically separate locations.

The computer 901 typically comprises a variety of computer readable media.

Exemplary readable media can be any available media that is accessible by the computer 901 and comprises, for example and not meant to be limiting, both volatile and non-volatile media, removable and non-removable media. The system memory 912 can comprise computer readable media in the form of volatile memory, such as random access memory (RAM), and/or non-volatile memory, such as read only memory (ROM). The system memory 912 typically can comprise data such as service/security data 907 and/or program modules such as operating system 905 and service/security software 906 that are accessible to and/or are operated on by the one or more processors 903.

In another aspect, the computer 901 can also comprise other removable/non-removable, volatile/non-volatile computer storage media. The mass storage device 904 can provide non-volatile storage of computer code, computer readable instructions, data structures, program modules, and other data for the computer 901. For example, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and service/security software 906. One or more of the operating system 905 and service/security software 906 (or some combination thereof) can comprise program modules and the service/security software 906. Service/security data 907 can also be stored on the mass storage device 904. Service/security data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 915.

In another aspect, the user can enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 903 via a human machine interface 902 that is coupled to the bus 913, but can be connected by other interface and bus structures, such as a parallel port, game port, an IEEE 1394 Port (also known as a Firewire port), a serial port, network adapter 908, and/or a universal serial bus (USB).

In yet another aspect, a display device 911 can also be connected to the bus 913 via an interface, such as a display adapter 909. It is contemplated that the computer 901 can have more than one display adapter 909 and the computer 901 can have more than one display device 911. For example, a display device 911 can be a monitor, an LCD (Liquid Crystal Display), light emitting diode (LED) display, television, smart lens, smart glass, and/or a projector. In addition to the display device 911, other output peripheral devices can comprise components such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914a,b,c. By way of example, a remote computing device 914a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 901 and a remote computing device 914a,b,c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components can reside at various times in different storage components of the computing device 901, and are executed by the one or more processors 903 of the computer 901. An implementation of service/security software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, via a first user device associated with a first user, a first input associated with a submission of a first service request,
   wherein the first service request defines a first time window during which the first service request can be opened and access to a first security device is authorized;
   receiving, via a second user device associated with a second user, a second input associated with a submission of a second service request,
   wherein the second service request defines a second time window during which the second service request can be opened and access to a second security device is authorized;
   assigning the first service request and the second service request to a third user device associated with a third user,
   wherein the first service request and the second service request are accessible via the third user device;
   selecting, via the third user device, the first service request;
   receiving a third input associated with a request to access the first security device during the first time window,
   wherein the request to access the first security device is associated with an opening of the first service request during the first time window, and
   wherein the third input is received in response to a first movement associated with the third user device;
   sending, based on a proximity of the third user device to the first security device, the request to access the first security device;
   receiving, based on the request to access the first security device and the proximity of the third user device to the first security device, first authentication information,
   wherein the first authentication information comprises first timing information;
   determining, based on the first timing information, a first security key,
   wherein the first security key is associated with the first time window and is valid during at least a portion of the first time window, and
   wherein determining the first security key comprises associating the first timing information with the first time window that is associated with the first security key;
   sending, based on the proximity of the third user device to the first security device and at least a portion of the first authentication information and the first security key, a first authentication response;
   accessing, based on the first authentication response matching a first expected authentication response, the first security device; revoking the first security key,
   wherein revoking the first security key is based on a closing of the first service request, and
   wherein revoking the first security key causes access to the first security device to be revoked;
   selecting, via the third user device, the second service request;
   receiving a fourth input associated with a request to access the second security device during the second time window,
   wherein the request to access the second security device is associated with an opening of the second service request during the second time window, and
   wherein the fourth input is received in response to a second movement associated with the third user device;
   sending, based on a proximity of the third user device to the second security device, the request to access the second security device;
   receiving, based on the request to access the second security device and the proximity of the third user device to the second security device, second authentication information,
   wherein the second authentication information comprises second timing information;
   determining, based on the second timing information, a second security key,
   wherein the second security key is associated with the second time window and is valid during at least a portion of the second time window, and
   wherein determining the second security key comprises associating the second timing information with the second time window that is associated with the second security key;
   sending, based on the proximity of the third user device to the second security device and at least a portion of the second authentication information and the second security key, a second authentication response;
   accessing, based on the second authentication response matching a second expected authentication response, the second security device;
   revoking the second security key,
   wherein revoking the second security key is based on a closing of the second service request, and
   wherein revoking the second security key causes access to the second security device to be revoked.

2. The method of claim 1,
   wherein the request to access the first security device comprises a first electronic lock identifier and a user device identifier; and
   wherein the request to access the second security device comprises a second electronic lock identifier and the user device identifier.

3. The method of claim 1,
wherein sending the request to access the first security device comprises sending the request to access the first security device via a short-range communication technique, and
wherein sending the request to access the second security device comprises sending the request to access the second security device via the short-range communication technique.

4. The method of claim 1,
wherein sending the request to access the first security device comprises one or more of sending the request to access the first security device to the first security device or sending the request to access the first security device to a network device,
wherein sending the request to access the second security device comprises one or more of sending the request to access the second security device to the second security device or sending the request to access the second security device to the network device, and
wherein the network device is configured to manage access to a plurality of security devices, the plurality of security devices includes the first security device and the second security device.

5. The method of claim 1,
wherein the first authentication information further comprises one or more of a first random bitstring or a first random value,
wherein the first expected authentication response comprises a first value, based on the first security key, generated by a non-reversible function,
wherein the second authentication information further comprises one or more of a second random bitstring or a second random value, and
wherein the second expected authentication response comprises a second value, based on the second security key, generated by the non-reversible function.

6. The method of claim 1,
wherein the first security key comprises one or more secret security keys, wherein each secret security key of the one or more secret security keys of the first security key is associated with a respective one or more first time windows of a plurality of first time windows of the first time window, wherein the first security key is valid during the respective one or more first time windows, and
wherein the second security key comprises one or more secret security keys, wherein each secret security key of the one or more secret security keys of the second security key is associated with a respective one or more second time windows of a plurality of second time windows of the second time window, wherein the second security key is valid during the respective one or more second time windows.

7. The method of claim 1,
wherein sending the first authentication response comprises generating, based on a non-reversible function applied to a random bitstring of the first authentication information and the first security key, the first authentication response, and
wherein sending the second authentication response comprises generating, based on the non-reversible function applied to a random bitstring of the second authentication information and the second security key, the second authentication response.

8. The method of claim 1,
wherein accessing the first security device comprises accessing a first location associated with the first security device, and
wherein accessing the second security device comprises accessing a second location associated with the second security device.

9. The method of claim 1,
wherein the first timing information comprises one or more of: a first current time indication, a time when the request to access the first security device is sent, or a time when the request to access the first security device is received, and
wherein the second timing information comprises one or more of: a second current time indication, a time when the request to access the second security device is sent, or a time when the request to access the second security device is received.

10. The method of claim 1,
wherein the first movement associated with the first user device is detected by a first sensor,
wherein the first sensor is adapted to detect at least one of an acceleration, a deceleration, or a rotation associated with the first movement;
wherein sending the request to access the first security device is further based on the first movement associated with the first user device,
wherein the second movement associated with the second user device is detected by a second sensor,
wherein the second sensor is adapted to detect at least one of an acceleration, a deceleration, or a rotation associated with the second movement; and
wherein sending the request to access the second security device is further based on the second movement associated with the second user device.

11. A method comprising:
receiving, from a first user device, a request to access a first security device,
wherein the request to access the first security device is associated with an input received by the first user device in response to a first movement associated with the first user device,
wherein the request to access the first security device is associated with an opening of a first service request,
wherein the opening of the first service request is associated with a selection of the first service request via the first user device,
wherein the first service request is submitted via a second user device and defines a first time window during which the first service request can be opened and access to the first security device is authorized, and
wherein the first service request is assigned to the first user device;
determining a proximity of the first user device to the first security device;
sending, based on the request to access the first security device and the proximity of the first user device to the first security device, first authentication information comprising first timing information;
generating, based on the first authentication information comprising the first timing information, a first expected authentication response associated with the first timing information;
determining that a first received authentication response matches the first expected authentication response, wherein the first received authentication response is based on the first timing information and a first security key, and
wherein the first security key is associated with the first time window associated with the first service request;
allowing, based on the first received authentication response matching the first expected authentication response, access to the first security device;
denying access to the first security device,
wherein the access denial to the first security device is based on a revoking of the first security key, and
wherein the revoking of the first security key is based on a closing of the first service request;
receiving, from the first user device, a request to access a second security device,
wherein the request to access the second security device is associated with an input received by the first user device in response to a second movement associated with the first user device,
wherein the request to access the second security device is associated with an opening of a second service request,
wherein the opening of the second service request is associated with a selection of the second service request via the first user device,
wherein the second service request is submitted via a third user device and defines a second time window during which the second service request can be opened and access to the second security device is authorized, and
wherein the second service request is assigned to the first user device;
determining a proximity of the first user device to the second security device;
sending, based on the request to access the second security device and the proximity of the first user device to the second security device, second authentication information comprising second timing information;
generating, based on the second authentication information comprising the second timing information, a second expected authentication response associated with the second timing information;
determining that a second received authentication response matches the second expected authentication response,
wherein the second received authentication response is based on the second timing information and a second security key, and
wherein the second security key is associated with the second time window associated with the second service request;
allowing, based on the second received authentication response matching the second expected authentication response, access to the second security device;
denying access to the second security device,
wherein the access denial to the second security device is based on a revoking of the second security key, and
wherein the revoking of the second security key is based on a closing of the second service request.

12. The method of claim 11,
wherein receiving the request to access the first security device comprises receiving the request to access the first security device via a short-range communication technique, and wherein receiving the request to access the second security device comprises receiving the request to access the second security device via the short-range communication technique.

13. The method of claim 11,
wherein the first authentication information comprises one or more of a first random bitstring or a first random value, wherein the first expected authentication response comprises a first value, based on the first security key, generated by a non-reversible function, and
wherein the second authentication information comprises one or more of a second random bitstring or a second random value, wherein the second expected authentication response comprises a second value, based on the second security key, generated by the non-reversible function.

14. The method of claim 11,
wherein the first received authentication response is based on a non-reversible function applied to a first random bitstring of at least a portion of the first authentication information and the first security key, and
wherein the second received authentication response is based on the non-reversible function applied to a second random bitstring of at least a portion of the second authentication information and the second security key.

15. The method of claim 11,
wherein allowing access to the first security device comprises allowing access to a location associated with the first security device, and
wherein allowing access to the second security device comprises allowing access to a location associated with the second security device.

16. The method of claim 11,
wherein the first timing information comprises one or more of: a first current time indication, a time when the request to access the first security device is sent, or a time when the request to access the first security device is received, and
wherein the second timing information comprises one or more of: a second current time indication, a time when the request to access the second security device is sent, or a time when the request to access the second security device is received.

17. The method of claim 11,
wherein the first movement associated with the first user device is detected by a first sensor,
wherein the first sensor is adapted to detect at least one of an acceleration, a deceleration, or a rotation associated with the first movement,
wherein the second movement associated with the second user device is detected by a second sensor,
wherein the second sensor is adapted to detect at least one of an acceleration, a deceleration, or a rotation associated with the second movement.

18. A system comprising:
a non-transitory computer readable medium; and
a plurality of instructions stored on the non-transitory computer readable medium, wherein the instructions are executed by one or more processors so that the following steps are executed:
receiving, via a first user device associated with a first user, a first input associated with a submission of a first service request, wherein the first service request defines a first time window during which the first service request can be opened and access to a first security device is authorized;
receiving, via a second user device associated with a second user, a second input associated with a submission of a second service request,
wherein the second service request defines a second time window during which the second service request can be opened and access to a second security device is authorized;
assigning the first service request and the second service request to a third user device associated with a third user,
wherein the first service request and the second service request are accessible via the third user device;
selecting, via the third user device, the first service request;
receiving a third input associated with a request to access the first security device during the first time window,
wherein the request to access the first security device is associated with an opening of the first service request during the first time window, and
wherein the third input is received in response to a first movement associated with the third user device;
sending, based on a proximity of the third user device to the first security device, the request to access the first security device;
receiving, based on the request to access the first security device and the proximity of the third user device to the first security device, first authentication information,
wherein the first authentication information comprises first timing information;
determining, based on the first timing information, a first security key,
wherein the first security key is associated with the first time window and is valid during at least a portion of the first time window, and
wherein determining the first security key comprises associating the first timing information with the first time window that is associated with the first security key;
sending, based on the proximity of the third user device to the first security device and at least a portion of the first authentication information and the first security key, a first authentication response;
accessing, based on the first authentication response matching a first expected authentication response, the first security device;
revoking the first security key,
wherein revoking the first security key is based on a closing of the first service request, and
wherein revoking the first security key causes access to the first security device to be revoked;
selecting, via the third user device, the second service request;
receiving a fourth input associated with a request to access the second security device during the second time window,
wherein the request to access the second security device is associated with an opening of the second service request during the second time window, and
wherein the fourth input is received in response to a second movement associated with the third user device;
sending, based on a proximity of the third user device to the second security device, the request to access the second security device;
receiving, based on the request to access the second security device and the proximity of the third user device to the second security device, second authentication information,
wherein the second authentication information comprises second timing information;
determining, based on the second timing information, a second security key,
wherein the second security key is associated with the second time window and is valid during at least a portion of the second time window, and
wherein determining the second security key comprises associating the second timing information with the second time window that is associated with the second security key;
sending, based on the proximity of the third user device to the second security device and at least a portion of the second authentication information and the second security key, a second authentication response;
accessing, based on the second authentication response matching a second expected authentication response, the second security device;
revoking the second security key,
wherein revoking the second security key is based on a closing of the second service request, and
wherein revoking the second security key causes access to the second security device to be revoked.

19. The system of claim 18,
wherein sending the request to access the first security device comprises one or more of sending the request to access the first security device to the first security device or sending the request to access the first security device to a network device,
wherein sending the request to access the second security device comprises one or more of sending the request to access the second security device to the second security device or sending the request to access the second security device to the network device, and
wherein the network device is configured to manage access to a plurality of security devices, including the first security device and the second security device.

20. The system of claim 18,
wherein the first authentication information further comprises one or more of a first random bitstring or a first random value, wherein the first expected authentication response comprises a first value, based on the first security key, generated by a non-reversible function, and
wherein the second authentication information further comprises one or more of a second random bitstring or a second random value, wherein the second expected authentication response comprises a second value, based on the second security key, generated by the non-reversible function.

21. The method of claim 18,
wherein the first security key comprises one or more secret security keys, wherein each secret security key of the one or more secret security keys of the first security key is associated with a respective one or more first time windows of a plurality of first time windows, wherein the first security key is valid during the respective one or more first time windows, and wherein the second security key comprises one or more secret security keys, wherein each secret security key of the one or more secret security keys of the second security key is associated with a respective one or more second time windows of a plurality of second time windows of the second time window, wherein the second security key is valid during the respective one or more second time windows.

22. The method of claim 18, wherein sending the first authentication response comprises generating, based on a non-reversible function applied to a first random bitstring of the first authentication information and the first security key, the first authentication response, and wherein sending the second authentication response comprises generating, based on the non-reversible function applied to a second random bitstring of the second authentication information and the second security key, the second authentication response.

23. The system of claim 18, wherein the first movement associated with the first user device is detected by a first sensor, wherein the first sensor is adapted to detect at least one of an acceleration, a deceleration, or a rotation associated with the first movement;

wherein sending the request to access the first security device is further based on the first movement associated with the first user device, wherein the second movement associated with the second user device is detected by a second sensor, wherein the second sensor is adapted to detect at least one of an acceleration, a deceleration, or a rotation associated with the second movement; and wherein sending the request to access the second security device is further based on the second movement associated with the second user device.

24. A system comprising:

a non-transitory computer readable medium; and a plurality of instructions stored on the non-transitory computer readable medium, wherein the instructions are executed by one or more processors so that the following steps are executed:

receiving, from a first user device, a request to access a first security device, wherein the request to access the first security device is associated with an input received by the first user device in response to a first movement associated with the first user device, wherein the request to access the first security device is associated with an opening of a first service request, wherein the opening of the first service request is associated with a selection of the first service request via the first user device, wherein the first service request is submitted via a second user device and defines a first time window during which the first service request can be opened and access to the first security device is authorized, and wherein the first service request is assigned to the first user device;

determining a proximity of the first user device to the first security device;

sending, based on the request to access the first security device and the proximity of the first user device to the first security device, first authentication information comprising first timing information;

generating, based on the first authentication information comprising the first timing information, a first expected authentication response associated with the first timing information;

determining that a first received authentication response matches the first expected authentication response, wherein the first received authentication response is based on the first timing information and a first security key, and wherein the first security key is associated with the first time window associated with the first service request;

allowing, based on the first received authentication response matching the first expected authentication response, access to the first security device;

denying access to the first security device, wherein the access denial to the first security device is based on a revoking of the first security key, and wherein the revoking of the first security key is based on a closing of the first service request;

receiving, from the first user device, a request to access a second security device, wherein the request to access the second security device is associated with an input received by the first user device in response to a second movement associated with the first user device, wherein the request to access the second security device is associated with an opening of a second service request, wherein the opening of the second service request is associated with a selection of the second service request via the first user device, wherein the second service request is submitted via a third user device and defines a second time window during which the second service request can be opened and access to the second security device is authorized, and wherein the second service request is assigned to the first user device;

determining a proximity of the first user device to the second security device;

sending, based on the request to access the second security device and the proximity of the first user device to the second security device, second authentication information comprising second timing information;

generating, based on the second authentication information comprising the second timing information, a second expected authentication response associated with the second timing information;

determining that a second received authentication response matches the second expected authentication response, wherein the second received authentication response is based on the second timing information and a second security key, and wherein the second security key is associated with the second time window associated with the second service request;

allowing, based on the second received authentication response matching the second expected authentication response, access to the second security device;

denying access to the second security device, wherein the access denial to the second security device is based on a revoking of the second security key, and
wherein the revoking of the second security key is based on a closing of the second service request.

25. The method of claim 24,
wherein the first authentication information comprises one or more of a first random bitstring or a first random value, wherein the first expected authentication response comprises a first value, based on the first security key, generated by a non-reversible function, and
wherein the second authentication information comprises one or more of a second random bitstring or a second random value, wherein the second expected authentication response comprises a second value, based on the second security key, generated by the non-reversible function.

26. The method of claim 24,
wherein the first received authentication response is based on a non-reversible function applied to a first random bitstring of the first authentication information and the first security key, and
wherein the second received authentication response is based on the non-reversible function applied to a second random bitstring of the second authentication information and the second security key.

27. The method of claim 24,
wherein allowing access to the first security device comprises allowing access to a first location associated with the first security device, and
wherein allowing access to the second security device comprises allowing access to a second location associated with the second security device.

28. The system of claim 24,
wherein the first movement associated with the first user device is detected by a first sensor,
wherein the first sensor is adapted to detect at least one of an acceleration, a deceleration, or a rotation associated with the first movement,
wherein the second movement associated with the second user device is detected by a second sensor,
wherein the second sensor is adapted to detect at least one of an acceleration, a deceleration, or a rotation associated with the second movement.

* * * * *